US007693984B2

(12) United States Patent
Bashford et al.

(10) Patent No.: US 7,693,984 B2
(45) Date of Patent: Apr. 6, 2010

(54) SYSTEMS AND METHODS FOR PROVIDING CURRENT STATUS DATA TO A REQUESTING DEVICE

(75) Inventors: David Bashford, West Jordan, UT (US); W. Bryant Eastham, Draper, UT (US); James L. Simister, Pleasant Grove, UT (US)

(73) Assignee: Panasonic Electric Works Co., Ltd., Osaka (JP)

(*) Notice: Subject to any disclaimer, the term of this patent is extended or adjusted under 35 U.S.C. 154(b) by 855 days.

(21) Appl. No.: 11/321,713

(22) Filed: Dec. 29, 2005

(65) Prior Publication Data

US 2007/0156840 A1 Jul. 5, 2007

(51) Int. Cl.
*G06F 15/173* (2006.01)
*G06F 15/16* (2006.01)
*H04L 12/26* (2006.01)
*H04L 1/18* (2006.01)
*H04J 3/16* (2006.01)
*H04J 3/24* (2006.01)
*H04L 1/00* (2006.01)

(52) U.S. Cl. ....................... 709/224; 709/217; 709/218; 709/223; 709/231; 709/232; 370/229; 370/346; 370/349; 714/748; 714/749

(58) Field of Classification Search ................. 709/223, 709/230, 232, 229, 224, 217–218, 225–226; 370/229, 908, 912, 346, 349; 714/748–749
See application file for complete search history.

(56) References Cited

U.S. PATENT DOCUMENTS 6,477,567 B1 * 11/2002 Ohara ........................ 709/223
6,532,491 B1 * 3/2003 Lakis et al. ................. 709/223
6,668,277 B1 * 12/2003 Gritzo ........................ 709/217
6,811,334 B2 11/2004 Koike et al.
7,006,507 B2 * 2/2006 Sano et al. .................. 370/400
7,011,461 B2 * 3/2006 Koike et al. .................... 400/61
7,295,550 B2 * 11/2007 Shimba et al. .............. 370/352
7,308,441 B2 * 12/2007 Cho et al. ....................... 707/3
2005/0265371 A1 * 12/2005 Sharma et al. .............. 370/428
2007/0019654 A1 * 1/2007 Ha et al. ...................... 370/400

FOREIGN PATENT DOCUMENTS

JP 09325809 A * 12/1997

OTHER PUBLICATIONS

Ziegler M et al; Secure Profile Management in Smart Home Networks; Aug. 22-26, 2005; IEEE Comput. Soc, Los Alamitos, CA, USA; 2006033; p. 209-13.*

* cited by examiner

*Primary Examiner*—Ashok B Patel
*Assistant Examiner*—Kai J Chang
(74) *Attorney, Agent, or Firm*—Austin Rapp & Hardman

(57) ABSTRACT

Systems and methods for providing status data to a requesting device are disclosed. A request for status data is transmitted from a requesting device to a providing device. The request includes prior values of variables stored at the requesting device. At the providing device, the transmitted prior values are compared with current values of the variables stored at the providing device. Changed variables, which comprise variables for which the current value is different from the prior value, are identified. A variable map is formulated that identifies the changed variables. Current values for the changed variables and variable map are organized into a pre-defined format to form status data. The status data is transmitted to the requesting device.

17 Claims, 13 Drawing Sheets

430

| Identifier 460b | Date/Time 472a | Request Map 474a | Prior Value A 468a | Prior Value B 468b | Prior Value C 468c | Prior Value D 468d | Prior Value E 468e |
|---|---|---|---|---|---|---|---|
| 100101 | 10/11/05 15:25:03 | 11111 | 253.12 | 112 | 1452.113 | On | 12345 |

430

| Identifier 460b | Date/Time 472a | Request Map 474a | Prior Value A 468a | Prior Value B 468b | Prior Value C 468c | Prior Value D 468d | Prior Value E 468e |
|---|---|---|---|---|---|---|---|
| 100101 | 10/11/05 15:25:03 | 11111 | 253.12 | 112 | 1452.113 | On | 12345 |

Fig. 4

530

| Identifier 560b | Date/Time 572a | Request Map 574a | Prior Value A 568a | Prior Value C 568c | Prior Value E 568e |
|---|---|---|---|---|---|
| 100101 | 10/11/05 15:25:03 | 10101 | 253.12 | 1452.113 | 12345 |

Fig. 5

630

| Identifier 680b | Date/Time 672a | Request Map 674a | Prior Value A 668a | Prior Value B 668b |
|---|---|---|---|---|
| 100101 | Null | 11000 | Null | Null |

Fig. 6

720

| Identifier 760c | Date/Time 772b | Variable Map 774b | Current Value A 770a | Current Value C 770c | Current Value E 770e |
|---|---|---|---|---|---|
| 100101 | 10/11/05 15:30:03 | 10101 | 253.34 | 1463.113 | 13445 |

Fig. 7

1130

| Identifier 1160b | Date/Time 1172a | Request Map, Part B 1174b | Prior Value B 1168b | Request Map, Part C 1174c | Prior Value C 1168c | Request Map, Part E 1174e | Prior Value E 1168e |
|---|---|---|---|---|---|---|---|
| 100101 | 10/11/05 15:25:03 | 2 | 253.12 | 3 | 112 | 5 | 1452.113 |

Fig. 11

1230

| Identifier 1260b | Date/Time 1272a |
|---|---|
| 100101 | Null |

Fig. 12

1320

| Identifier 1360c | Date/Time 1372b | Variable Map, Part A 1375a | Current Value A 1370a | Variable Map, Part C 1375c | Current Value C 1370c |
|---|---|---|---|---|---|
| 100101 | 10/11/05 15:25:03 | 1 | 253.12 | 3 | 112 |

Fig. 13

SYSTEMS AND METHODS FOR PROVIDING CURRENT STATUS DATA TO A REQUESTING DEVICE

TECHNICAL FIELD

The present invention relates generally to computers and computer-related technology. More specifically, the present invention relates to systems and methods for providing status data to a requesting device.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional, complete computer system. For example, these small computers may be a one-chip computer, such as a microcontroller; a one-board type of computer, such as a controller; or a typical desktop computer, such as an IBM-PC compatible, etc.

Computers typically have one or more processors at the heart of the computer. The processor(s) are usually interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor (s).

Embedded systems may be utilized in a wide variety of different scenarios. For example, lighting systems may utilize embedded technology. In particular, an embedded system may be used to monitor and control a lighting system. For example, an embedded system could be used to dim or increase the brightness of an individual light or a set of lights within a lighting system. An embedded system may be used to create a specific lighting pattern by activating individual lights within the lighting system. Embedded systems may be coupled to individual switches within the lighting system. An embedded system may instruct the switches to power up or power down individual lights or the entire lighting system. The brightness or power state of each individual light may thus be controlled by the embedded system.

Security systems may likewise utilize embedded technology. An embedded system may be used to control and monitor the individual security sensors within a security system. An embedded system may provide controls to power up each of the security sensors automatically at a specific time of day or night. An embedded system may be coupled to a motion sensor. An embedded system may power up the individual motion sensor automatically and provide controls to activate a video camera and/or an alarm, if motion is detected. Embedded systems may also be coupled to sensors monitoring a door or a window and take specified action when activity is sensed.

Embedded technology may also be used to control wireless products, such as cell phones. An embedded system may provide instructions to power up the display of the cell phone. An embedded system may also activate the audio speakers within the cell phone to provide the user with an audio notification of an incoming call.

Home appliances, such as stoves, refrigerators, or microwave ovens, may also incorporate embedded technology. For example, a massage recliner may incorporate an embedded system to provide instructions to automatically recline the back portion of the chair according to the preferences of the user. An embedded system may also provide instructions to initiate the oscillating components within the chair according to the preferences of the user.

Additional products typically found in homes may also incorporate embedded systems. For example, an embedded system may be used within a toilet to control the level of water used to refill the water supply tank. Embedded systems may be used within a jetted bathtub to, for example, control the outflow of air.

Embedded devices, and other computer systems, often contain status data about the devices themselves and/or a system or entity monitored by the devices. Furthermore, it is frequently desirable to maintain a history of the status data gathered by these devices. These devices can be coupled to a network to allow remote access to the compiled status histories.

Unfortunately, maintaining the status histories is complex and requires a significant amount of memory and processing power. For example, many different users may want to obtain status history data from a particular device. One user may want the device to maintain the status history in 15-second intervals, while another user may wish to maintain a status history in 3.5-second intervals. Accordingly, the device may have to maintain a separate history for each user requesting a status history. These tasks can become extraordinarily complex and require a significant amount of memory and processing power if a handful of users wish to obtain status histories at different time intervals. If hundreds or thousands of such requests are made, the complexity of the task becomes immense and the device will require significant amounts of memory and processing power. Furthermore, significant network bandwidth can be consumed if status histories or status data are transmitted to numerous remote users when short time intervals are used.

Accordingly, benefits may be realized by improved systems and methods for providing status data to a requesting device. Some exemplary systems and methods for providing status data to a requesting device are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIGS. 4, 5, and 6 are tables illustrating embodiments of various types of requests utilized within a monitoring system;

FIG. 7 is a table illustrating an embodiment of status data produced by a monitoring system;

FIGS. 11 and 12 are tables illustrating embodiments of requests in accordance with a pre-defined format illustrated in FIG. 10;

FIG. 13 is a table illustrating one embodiment of status data in accordance with a pre-defined format illustrated in FIG. 10;

DETAILED DESCRIPTION

Figure 1:
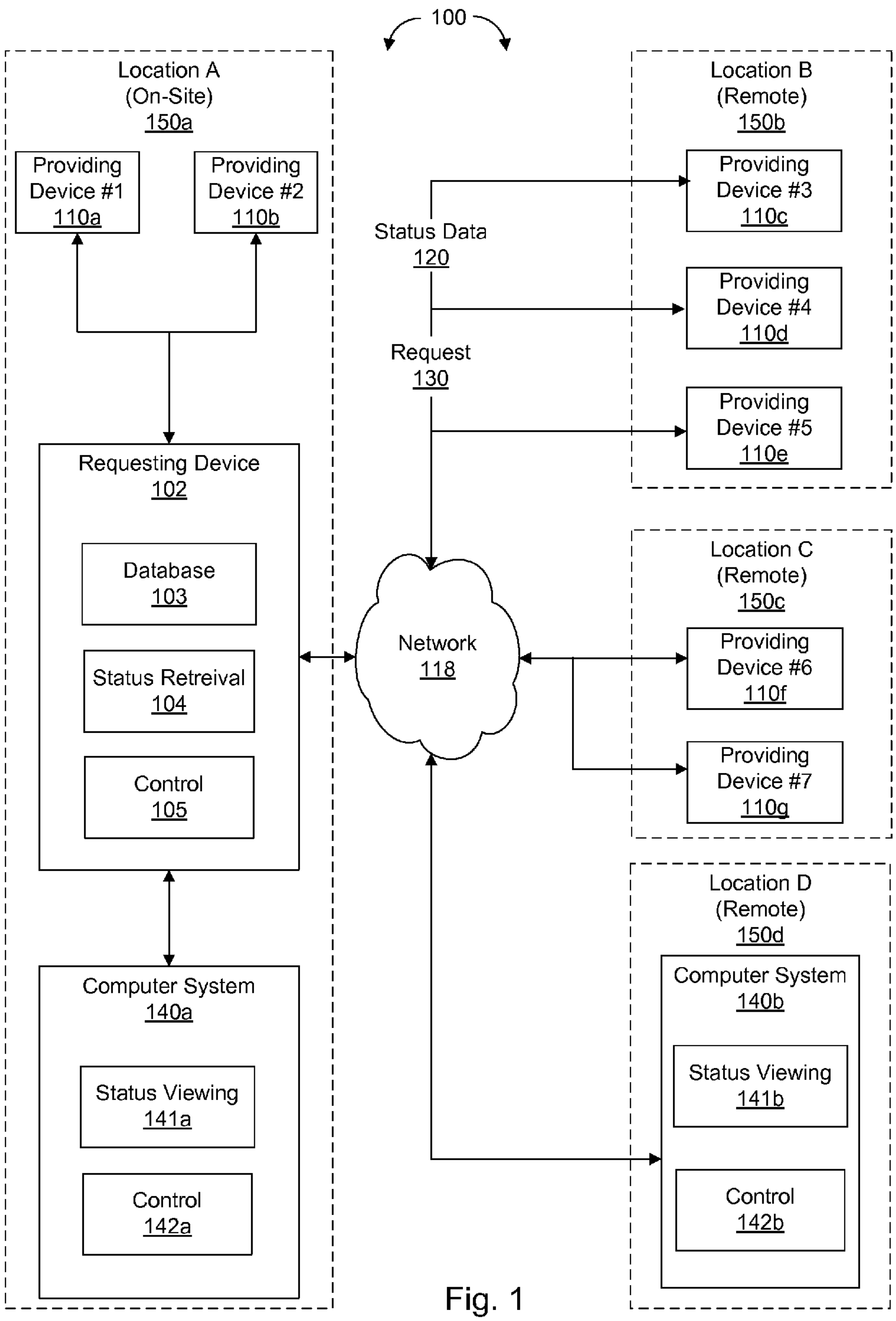
FIG. 1 is a block diagram illustrating one embodiment of a control/monitoring system.

A method for providing current status data to a requesting device is disclosed. A request for status data is transmitted from a requesting device to a providing device. The request includes prior values of variables stored at the requesting device. At the providing device, the transmitted prior values are compared with current values of the variables stored at the providing device. Changed variables that comprise variables for which the current value is different from the prior value are identified. A variable map that identifies the changed variables is formulated. Current values for the changed variables and the variable map are organized into a pre-defined format to form status data. The status data is transmitted to the requesting device.

In one embodiment, the variable map further identifies which variables have not changed. The request may further comprise a request map that identifies variables for which current values are requested.

The variable map, in one embodiment, may comprise a series of bits, each bit corresponding to one of the variables stored by the providing device. One bit value indicates that the corresponding variable is a changed variable, and another bit value indicates that the current and prior values of the corresponding variable are equal. In one embodiment, the order of variables in the status data is determined by an order of the variables within an interface definition. Further, in such an embodiment, an order of bits within the series of bits may correspond to the order of the variables within the interface definition. Alternatively, the variable map comprises a series of integers, each integer identifying a variable stored by the providing device.

The request may be organized into a pre-defined format. Also, the providing device may be an embedded device. The status data may further comprise an identifier that uniquely identifies the providing device. The prior values of variables stored by the requesting device may be null values.

Systems for performing the foregoing methods are also disclosed. The system includes a providing device having provider memory and a provider processor in electronic communication therewith. A requesting device includes requestor memory and a requestor processor in electronic communication therewith. The providing device and the requesting device are in electronic communication with each other. Instructions stored in the provider memory and in the requester memory are executable to implement methods disclosed herein. A computer-readable medium for performing the foregoing systems and methods is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "computing device" refers to any type of electronic device having a processor, which typically performs arithmetic or logical operations. The computing device may include memory (e.g., random access memory (RAM)), flash memory, and/or a hard disk storage device). The computing device may process instructions stored in memory. A computing device may optionally include other components, such as communication interfaces (e.g., a network card or modem) for communicating with other devices, inputs for receiving user input (e.g., a keyboard, touchpad, or mouse) or outputs (e.g., audio outputs or a display screen) for providing information to a user. Additionally, it should be noted that a computing device may be embodied as different types of devices, such as a desktop computer, server, tablet PC, notebook computer, personal data assistant (PDA), cellular phone, or embedded device.

FIG. 1 is a block diagram illustrating one embodiment of a control/monitoring system 100. The system 100 includes a requesting device 102 and a number of providing devices 110*a-g* in electronic communication via a network 118. The providing devices 110 provide status data 120 in response to a request 130 from the requesting device 102. The system 100 also includes computer systems 140 that may be used to view status data 120 and/or control the providing devices 110. The requesting device 102, providing devices 110, and computer systems 140*a-b* may be situated at various locations (e.g., location A 150*a*, location B 150*b*, location C 150*c*, and location D 150*d*) and may be in electronic communication with each other via the network 118 or other communication channel.

The providing devices 110 store status data 120 that is requested by the requesting device 102. The status data 120 may be stored in volatile (e.g., random access memory) or nonvolatile memory (e.g., a hard disk storage device). The data 120 may be embodied in numerous ways. For example, the status data 120 could comprise data regarding the operating state or condition of the providing device 110. Alternatively, the status data 120 could pertain to the state or condition of a system or entity monitored by the providing device 110. As a more specific example, the providing device 110 may be an echocardiogram machine, and the status data 120 could identify the heart rate of a monitored patient. Accordingly, a providing device 110 is any device that stores status data 120, i.e., data pertaining to the state of the requesting device or any monitored system or entity.

The requesting device 102 is any computing device that can transmit a request to a providing device 110. The requesting device 102 may include a series of separate components or computing devices. For example, the requesting device may encompass one computing device to transmit the request 130, a second computing device to receive the status data 120, and a third computing device to store the received status data 120.

In one embodiment, the requesting device 102 may include a database 103, a status retrieval component 104, and a control component 105. The database 103 may be utilized to store and organize status data 120 received from the providing devices 110.

The status retrieval component 104 may control transmission of requests 130 for status data 120. The status retrieval component 104 may further control receipt and processing of received status data 120 prior to storage of the status data 120 in the database 103.

An optional control component 105 may be utilized to control the providing devices 110. More specifically, the control component 105 could be utilized to transmit control commands to providing devices 110.

The two disclosed computer systems 140*a-b* may comprise any computing device (e.g., a personal digital assistant (PDA) or laptop computer) utilized to view status data 120 and/or to control providing devices 110. The computer systems 140*a-b* may be separate from or integrated with the requesting device 102 or one or more providing devices 110.

The computer systems 140*a-b* may include a status viewing component 141*a-b* and a control component 142*a-b*. The viewing component 141 may be utilized to retrieve and view data 120 stored in the database 103 of the requesting device 102. The control component 142 could be utilized, for example, to transmit control commands directly to a providing device 110 or to transmit commands to the requesting device 102, which could, in turn, transmit the same or corresponding control commands to one or more providing devices 110.

The system 100 disclosed in FIG. 1 enables gathering of status data 120 from remote locations, such as various places situated throughout a particular, building, factory, facility, country, or the world. Furthermore, the disclosed system 100 could enable remote management of the providing devices 110. In one embodiment, the providing devices 110 may be embedded computing devices. An embedded computing device is a computing device in which many or all of the programming commands processed by the device are stored in read-only memory.

The network 118 is a communication channel though which data may be transmitted between, for example, a requesting device 102 and a providing device 110. The network 118 may be embodied in various ways. For example, the network 118 may include local area networks (LANs), storage area networks (SANs), metropolitan area networks (MANs), wide area networks (WANs), or combinations thereof (e.g., the Internet) with no requirement that the requesting device 102 and providing device 110 reside at the same physical location 150, within the same network 118 segment, or even within the same network 118. A variety of different network configurations and protocols maybe used, including Ethernet, TCP/IP, UDP/IP, IEEE 802.11, IEEE 802.16, BLUETOOTH wireless communication protocol, asynchronous transfer mode (ATM), fiber distributed data interface (FDDI), token ring, wireless networks (e.g., 802.11 g or a wireless telephone/data network), proprietary formulas, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network." The network 118 may also comprise, in one embodiment, an embedded device network produced by Matsushita Electric Works, Ltd. of Osaka, Japan. An embedded device network comprises distributed networks of requestors, providers, and intervening nodes that allow rapid re-routing of communication channels when network failures occur.

The disclosed system 100 may be embodied in various ways beyond the manner illustrated in FIG. 1. For example, in one embodiment, components 105, 142 related to control of the providing devices 110 are omitted, such that the system 100 becomes a monitoring system (as will be illustrated in, for example, FIG. 3). Furthermore, the disclosed system 100 may include many requesting devices 102, and any number of computer systems 140*a-b* or providing devices 110, situated in a single location or positioned at any number of remote locations 150*b-d*.

Figure 2:
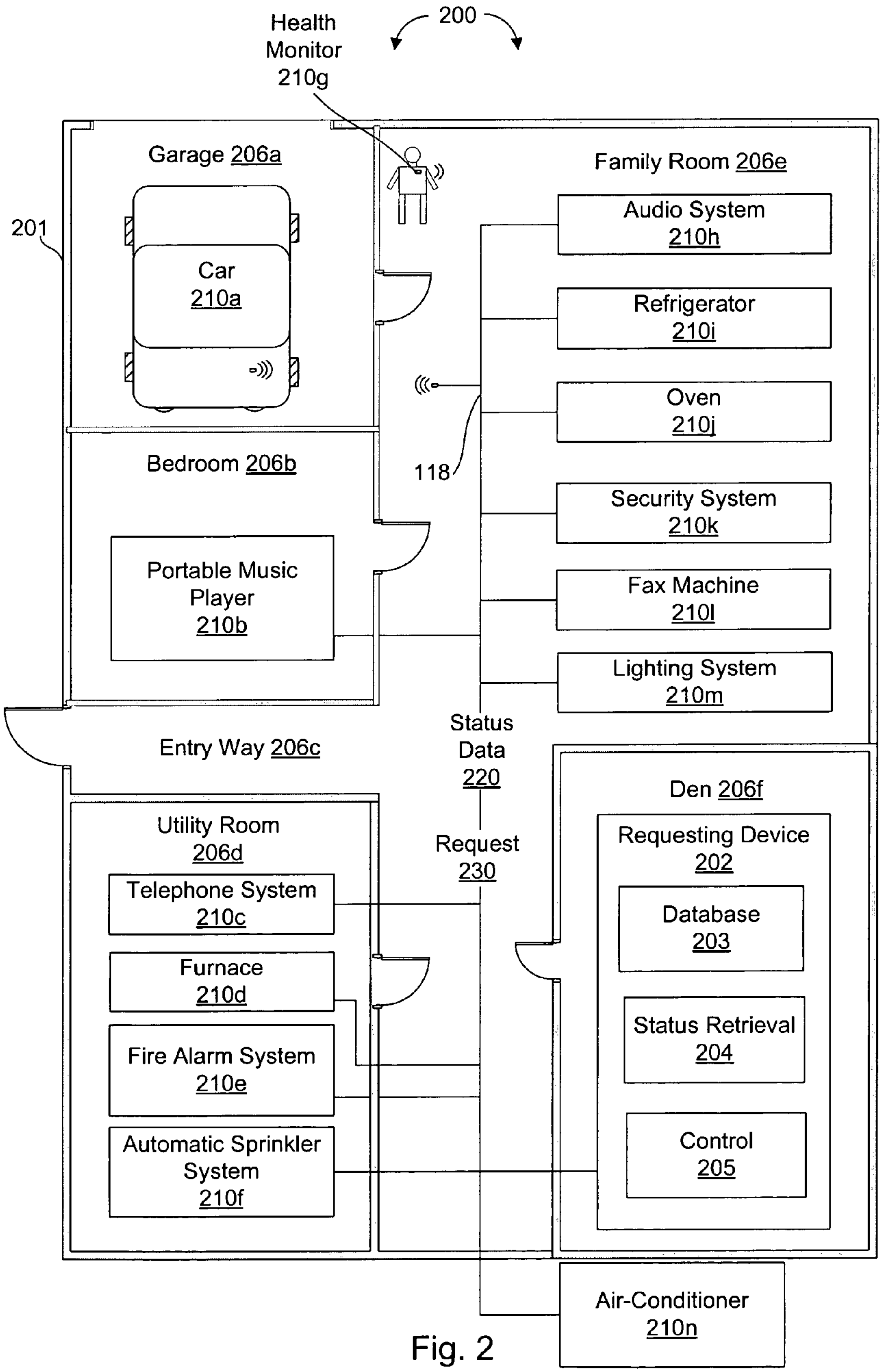
FIG. 2 is a block diagram illustrating one embodiment of a control/monitoring system shown within a home.

FIG. 2 illustrates one embodiment of a control/monitoring system 200 shown within a home 201. The depicted home 201 includes a garage 206*a* housing a car 210*a*, a bedroom 206*b*, an entryway 206*c*, a utility room 206*d*, a family room 206*e*, and a den 206*f*. The diagram of FIG. 2 depicts the first floor of the home 201. For simplicity, the second, or other floors, are not shown.

The home 201 illustrated in FIG. 2 is, of course, only exemplary. The control/monitoring system 200 may be utilized in various environments, such as an office building, an apartment complex, a neighborhood, a city, a country or various countries.

As shown in FIG. 2, the requesting device 202 includes a database 203, a status retrieval component 204, and a control component 205. These items 203, 204, 205 perform the same functions as those described in FIG. 1. In the illustrated embodiment, a request 230 for status data 220 is transmitted by the requesting device 202 to one of the providing devices 210. In response, status data 220 is transmitted from the pertinent providing device 210 to the requesting device 202.

FIG. 2 illustrates a number of different exemplary types of providing devices 210. In particular, FIG. 2 illustrates a car 210*a*, a portable music player 210*b*, a telephone system 210*c*, a furnace 210*d*, a fire alarm system 210*e*, an automatic sprinkler system 210*f*, a health monitor 210*g*, an audio system 210*h*, a refrigerator 210*i*, an oven 210*j*, a security system 210*k*, a fax machine 210*l*, a lighting system 210*m*, and an air-conditioner 210*n*.

Each of these providing devices 210 could include a computing device that maintains status data 220 that could be retrieved and stored by the requesting device 202. For example, status data 220 from the car 210*a* could include data related to potential maintenance or malfunction issues. Status data 220 for the health monitor 210*g* could include heart and respiration rates. Status data from the refrigerator 210*i* could indicate, for example, how long certain items have been stored therein using radio frequency identification (RFID) technology. Status data 220 for the lighting system 210*m* could indicate which lights are currently on. Status data 220 for the telephone system 210*c* could indicate when voice messages have been received but not retrieved, Of course, the foregoing types of status data are only illustrative.

As indicated above, the system 200 disclosed herein may be embodied in various ways. For example, a monitoring/control system 200 may be utilized within a hospital to gather status data from numerous types of medical monitoring devices. The disclosed system 200 could be utilized to remotely monitor field devices for gathering weather data, such as wind, temperature, and precipitation information. It could be utilized in a factory to monitor the status of various machines within the factory. There are many different ways in which the disclosed system 200 may be utilized beyond those disclosed herein.

Figure 3:
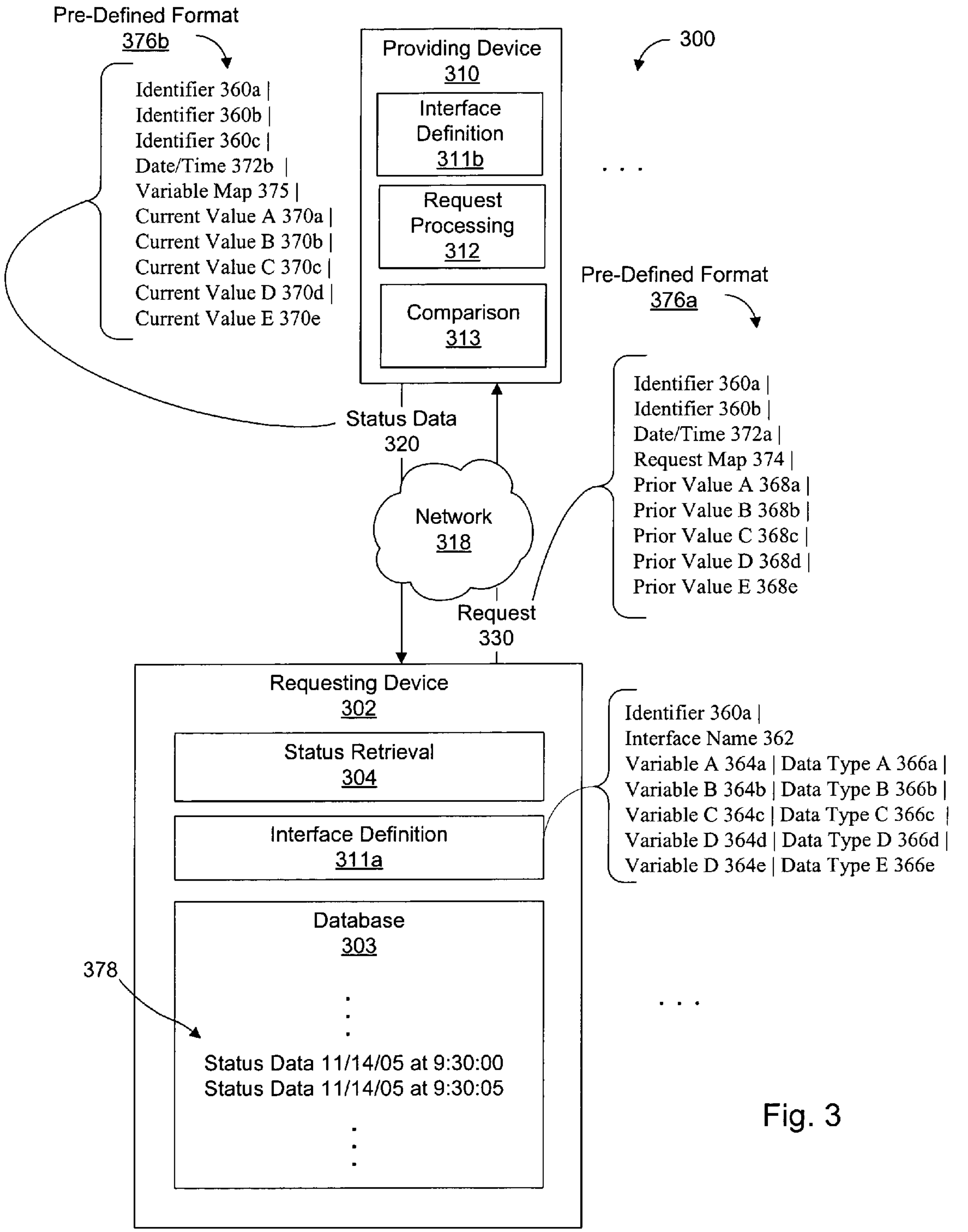
FIG. 3 is a block diagram illustrating one embodiment of a monitoring system.

FIG. 3 illustrates one embodiment of a monitoring system 300. The system 300 includes a requesting device 302, a providing device 310, and a network 318. For simplicity, a computer system 140 (shown in FIG. 1) for viewing the status data is not separately shown in FIG. 3, although the requesting device 302 could be integrated with such a computer system 140.

As explained above, the requesting device 302 could include a status retrieval component 304, an interface definition 311*a*, and a database 303. The database 303 stores status data 320 related to one or more providing devices 310. The status retrieval component 304 is utilized to request and receive status data from providing devices 310. The status retrieval component 304 could include hardware and/or software necessary to perform these functions. For example, the status retrieval component 304 could encompass network communication components, software, and/or firmware for transmitting requests 330 and receiving status data 320.

The requesting device 302 may include an interface definition 311*a*. The interface definition 311*a* includes an identifier 360*a*, an interface name 362, and various variable names 364*a-e* and data types 366*a-e*. The identifier 360*a* is a code or name that uniquely identifies a particular set of variables 364 with their corresponding types 366 (an interface definition 311*a*), and may be used by the requesting device 302 and providing device 310 in place of a full set of variables and types. The identifier 360*a* may be represented, for example, as a unique series of binary or hexadecimal digits. The line character "|" is used in the figures of this application to indicate a division between data fields.

The interface name 362 is a name of the providing device 310 by which consumers could refer to the providing device 310. Accordingly, interface name 362 could be a series of string characters.

The variable names 364 are names or identifiers by which variables stored by the providing device 310 may be referenced. Each data type 366 defines a data type of the variable referred to by the name 364 preceding the data type. Data types 366 may be embodied in numerous ways (e.g., integers, strings, date or time formats, currency values, arrays, long integers, or double precision numbers) and may include user-defined data types (e.g., days of the week or temperatures).

The interface definition 311*a* may be transferred to the requesting device 302 from a portable storage device (e.g., a CD-ROM, flash memory drive, or floppy disk) or may be transferred from the providing device 310 to the requesting device 302 via the network 318. As indicated above, the network 318 may be embodied in various ways and is utilized to transmit data between the requesting and providing devices 302, 310. As will be explained below, the interface definition 311*a* is utilized to define standard communication protocols and the format for data exchanged by the requesting device 302 and the providing device 310.

The providing device 310, as indicated in FIG. 3, may also include the interface definition 311*b*, a request processing component 312, and a comparison component 313. The interface definition 311*b* of the providing device 310 is the same as the interface definition 311*a* utilized by the requesting device 302. Utilizing this standard interface definition 311*a* facilitates exchanges of data between the requesting and providing devices 302, 310. The request processing component 312 processes requests 330 received from the requesting device 302. The comparison component 313 compares prior values 368 of variables 364 received from the requesting device 302 to current values 370 of those variables 364 stored by the providing device 310.

The monitoring process performed by the system 300 is initiated by a request 330 from the requesting device 302. The request 330 may include the interface identifier 360*a*, the device identifier 360*b*, a date/time field 372*a*, a request map 374, and possibly one or more prior values 368. The identifier 360*b* is the unique identifier associated with the providing device 310. The optional date/time field 372*a* identifies the date and/or time associated with the prior values 368 (e.g., approximately when prior values were gathered by and/or stored at the providing device 310).

The prior values 368 comprise status data 320 that was previously retrieved from the providing device 310. One or more of the prior values 368 may be a null value if, for example, the requesting device 302 does not have a prior value 368 for the variable in question or is not requesting a current value 370 for the variable 364 in question. As used in this application, the null value may be a pre-defined character or code or may simply be an omission of data for the pertinent field or prior value (e.g., the request data ends with a designated termination character before data for all fields is provided). In one embodiment, null values in the request or status data 330, 320 are indicated by the request or status map 374, 375. For example, null values could be indicated by a 0 in the respective maps 374, 375.

The request map 374 identifies which variables are requested, and will be explained in greater detail in connection with FIGS. 4-7. The prior values 368 are arranged in the same order as the variables/data types 364/366 set forth in the interface definition 311*a*. The request 330 is thus organized into a pre-defined format 376*a* (e.g., defined by reference to the interface definition 311*a*) such that the providing device 310 will properly interpret the request 330.

The pre-defined format 376*a* may be organized in various ways. For example, the identifier 360*b* may be omitted if the request 330 is being sent only to the providing device 310. Furthermore, the order of the fields of the request 330 may be rearranged and, in certain cases, the date/time field 372*a*, request map 374, and prior values 368 may likewise be omitted. In one embodiment, including a null value in the request map field and/or the prior value fields indicates that current values 370 for all variables 364 are to be requested.

In one embodiment, when the request 330 is received by the providing device 310, current values for the identified variables 364 are determined or identified utilizing the request processing component 312. The request processing component 312 utilizes the interface definition 311*b* to interpret the received request 330, such as to identify which data is associated with a particular prior value 368 or request map 374.

In one embodiment, the comparison component 313 then determines whether the received prior values 368 are different from the current values 370 for the pertinent variables 364. In such an embodiment, the providing device 310 may be configured to return only the current values 370 for the changed variables, i.e., variables 364 for which the current value 370 is different from the received prior value 368.

The status data 320 is returned to the requesting device 302 in a pre-defined format 376*b* based on the interface definition 311*b*. The illustrated pre-defined format 376*b* includes the interface identifier 360*a*, the device identifier 360*b*, identifier 360*c*, a date/time field 372*b*, a variable map 375, and various current values 370. As indicated above, the identifier 360*c* is a unique code or name associated with the providing device 310. The date/time field 372*b* indicates the date and/or time associated with the current values 370 included in the status data 320. The variable map 375 indicates which current values 370 are being transmitted to the requesting device 302. As indicated, in one embodiment, only current values that were requested and that are different from the prior values 368 are included in the status data 320.

Following receipt of the status data 320, this data 320 may be stored in a database 303 to compile or add to a history 378 of the status data 320. Alternatively or in conjunction with storage of the status data in the database 303, the status data 320 may be transferred to a computer system 140 (shown in FIG. 1) for viewing.

The disclosed system 300 may be embodied in a number of different ways. For example, the status and request data 320, 330 may be formatted in accordance with one or more various network protocols, such as Transmission Control Protocol/Internet Protocol (TCP/IP). The protocols (TCP/IP, etc.) used to send data 320/requests 330, or the data 320/requests 330 themselves should incorporate the ability to match up requests 330 and status data 320, so that the requesting device 302 and providing device 310 can process the data 320 and requests 330 in the appropriate order. The data 320, 330 may also be encrypted or encoded in various ways. Furthermore, various fields of the request and status data 320 and requests 330 may be placed in a different order or may be omitted. For example, the identifier 360*c* may be omitted. The identifier 360*a* may, in one embodiment, be need only if the status data 320 is transmitted from the requesting device 302 or providing device 310 to another device. The interface name 362 may be omitted from the interface definition 311*a-b*.

Illustrative embodiments of requests 330 and corresponding status data 320 include the following: (1) a request 330 with an interface identifier 360*b* and no other fields indicates that the providing device 310 should send status data 320 with an identifier 360*c*, a date/time value 372*b*, a variable map 375 with all 1's, and all current values 370 for providing device 310 (e.g., a full snapshot); (2) a request 330 with an identifier 360*b*, selected 1's in the request map 374 and no prior values 368 indicates that the providing device 310 should send status data 320 with an identifier 360*c*, a date/time value 372*b*, variable map 375 matching the 1's sent in the request 330, and select current values 370 determined by variable map 375 (e.g., a partial snapshot); (3) a request 330 with an identifier 360*b* and a request map 374 with some 1's and a matching number of prior values 368 indicates that the providing device 310 should send status data 320 with an identifier 360*c*, a date/time value 372*b*, a variable map 375 with 1's only for variables 364 that have changed value, and current values 370 that have changed for requested variables 364 indicted by the request map 374 (e.g., a partial comparison snapshot); (4) a request 330 with an identifier 360*b*, all 1's in map 374 and all prior values 368 indicates that the providing device 310 should send status data 320 with an identifier 360*c*, a date/time value 372*b*, a variable map 375 with 1's only for variables that have changed, and current values 370 that have changed (e.g., a full comparison snapshot). Again, in one embodiment, the date time field 372*b* is not required in certain requests 330. Illustrative requests 1 and 2 may use a request processing component 312, but not a comparison component 313. Illustrative requests 3 and 4 may use both the processing component 312 and the comparison component 313. The foregoing illustrative requests 330 and status data 320 are merely exemplary embodiments and are not limiting of the types of requests 330, status data 320, or requesting and providing devices 302, 310 encompassed within the scope of the disclosed systems and methods.

FIGS. 4, 5, and 6 are tables illustrating embodiments of various types of requests 430, 530, 630, while FIG. 7 is a table illustrating an embodiment of status data 720. With reference specifically to FIG. 4, exemplary identifiers 460*b* and date/time values 472*a* are shown. An illustrative request map 474*a* is also shown. As explained above, the request map 474*a* identifies variables for which current values are requested. In the illustrated embodiment, the request map 474*a* is a series of bits. Each bit corresponds to a variable 364 identified in an interface definition 311. Accordingly, the interface definition associated with the map 474*a* shown in FIG. 4 includes five variables 364 because there are five bit values in the map 474*a*. The order of the bits in the request map 474*a* corresponds to the order of the variables 364 in the interface definition 311. Accordingly, the first bit corresponds to variable A 364*a* in the interface definition 311, the second bit corresponds to variable B 364*b* in the interface definition 311, and so on. Alternatively, other ordering systems could be utilized, such as a reverse order correspondence between the series of bits and the variables 364 in the interface definition 311.

In the illustrated embodiment, a bit value of "1" indicates that a current value 370 for the identified variable 364 is requested. The presence of a "0" would indicate that that corresponding current value 370 is not requested. Of course, the reverse could be true, i.e., a "0" could indicate that a particular value is requested, and a "1" could indicate that the value 370 is not requested. Furthermore, the map 474*a* could be converted to a hexadecimal or other type of number, rather than a binary number. The request map 474*a* shown in FIG. 4 ("11111"), indicates that current values 370 for all pertinent variables 364 are requested. Further, prior values 468 for all the pertinent variables 364 are provided in the request 430. These prior values 468 may be compared to current values 370 for the corresponding variables when received by the providing device 310. In an alternate embodiment, the request map 474*a* may be omitted and pre-determined values (like null values) could be used as indicators that no value is being requested. In still another embodiment, the request map 474*a* may be omitted indicating that all current values 770 are requested.

With reference to FIG. 5, an identifier 560*b* and date/time value 572*a* are likewise included in the request 530. With respect to a request 530, the illustrated request map ("10101") indicates that current values 370*a*, 370*c*, 370*e* for only variables A, C, and E 364*a*, 364*c*, 364*e* are requested because only the bits in the first, third, and fifth positions are 1's. The 0's in the second and fourth bit positions indicate that current values 370*b*, 370*d* for the variables B and D 364*b*, 364*d* in the associated interface definition 311 are not requested.

FIG. 6 illustrates another embodiment of a request 630. This request 630 includes a unique identifier 680*b* for the providing device 310. However, the date/time value 672*a* and prior values 668*a-b* are "null" values. As explained above, the null value may be identified by a code designated as a "null" code, or alternatively may be identified by the absence of data positioned within the corresponding field space (e.g., a request termination code is found before data for pertinent data field is reached). The "null" value could indicate that the requesting device 302 determined not to provide this data (perhaps, at the request of the user) or that the requesting device 302 simply did not have the data to be included in a pertinent field. For example, if the request 630 is the first request transmitted to the providing device 310, the requesting device 302 may not have prior values 668. The request map 674*a* shown in FIG. 6 indicates that current values for variables A and B 364*a*, 364*b* of the interface definition 311 are requested.

Many different types of alternative embodiments of requests 630 are possible beyond those shown in FIGS. 4, 5, and 6. For example, in one embodiment, all fields except, for example, the identifier 680*b* could be null. In such a case, the providing device 310 could be configured to interpret this type of request as a request 630 for current values 370 of all variables 364 stored by the providing device 310. Alternatively, the identifier 680*b* could be null if only one providing device 310 is coupled to the requesting device 302. Further, many different types of variables are possible within the scope of the disclosed systems and methods. Also, the variable map may be embodied in a number of different ways.

FIG. 7 is a table illustrating an embodiment of status data 720. An identifier 760*c* is included in the illustrated status data 720. As indicated, an identifier 760*c* may not be necessary if only one providing device 310 is coupled to the requesting device 302. The date/time value 772*b* shows the date and/or time associated with the current values 770 included in the status data 720.

The variable map 774*b* in the illustrated embodiment is formatted in a similar way to the request map 674*a* shown in FIGS. 4-6. In other words, each bit is associated with a particular variable 364 in the interface definition 311. The order of the bits also corresponds to the order of the variables 364 within the interface definition 311. As a result, the variable map 774*b* shown in FIG. 7 indicates that current values 770*a*, 770*c*, 770*e* for variables A, C, and E 364*a*, 364*c*, 364*e* are included in the status data 720.

The pertinent status data 720 could be produced by a number of different scenarios. For example, current values 770*a*, 770*c*, 770*e* for the variables A, C, and E 364*a*, 364*c*, 364*e* could have been requested. As another example, this type of status data 720 could have been produced because status data for all pertinent variables 364 was requested, but only variables A, C, and E 364*a*, 364*c*, 364*e* had changed relative to the prior values 668.

Of course, the status data 720 may be embodied in various ways within the scope of the disclosed systems and methods. The number of variables 364 may, for example, be altered. The data types of each of the variables 364 may be embodied in a number of different ways. The order of the fields and variables 364 may be modified. Also, the variable map may be configured in various ways to achieve the purpose of identifying the current values 770 provided in the status request 720.

Figure 8:
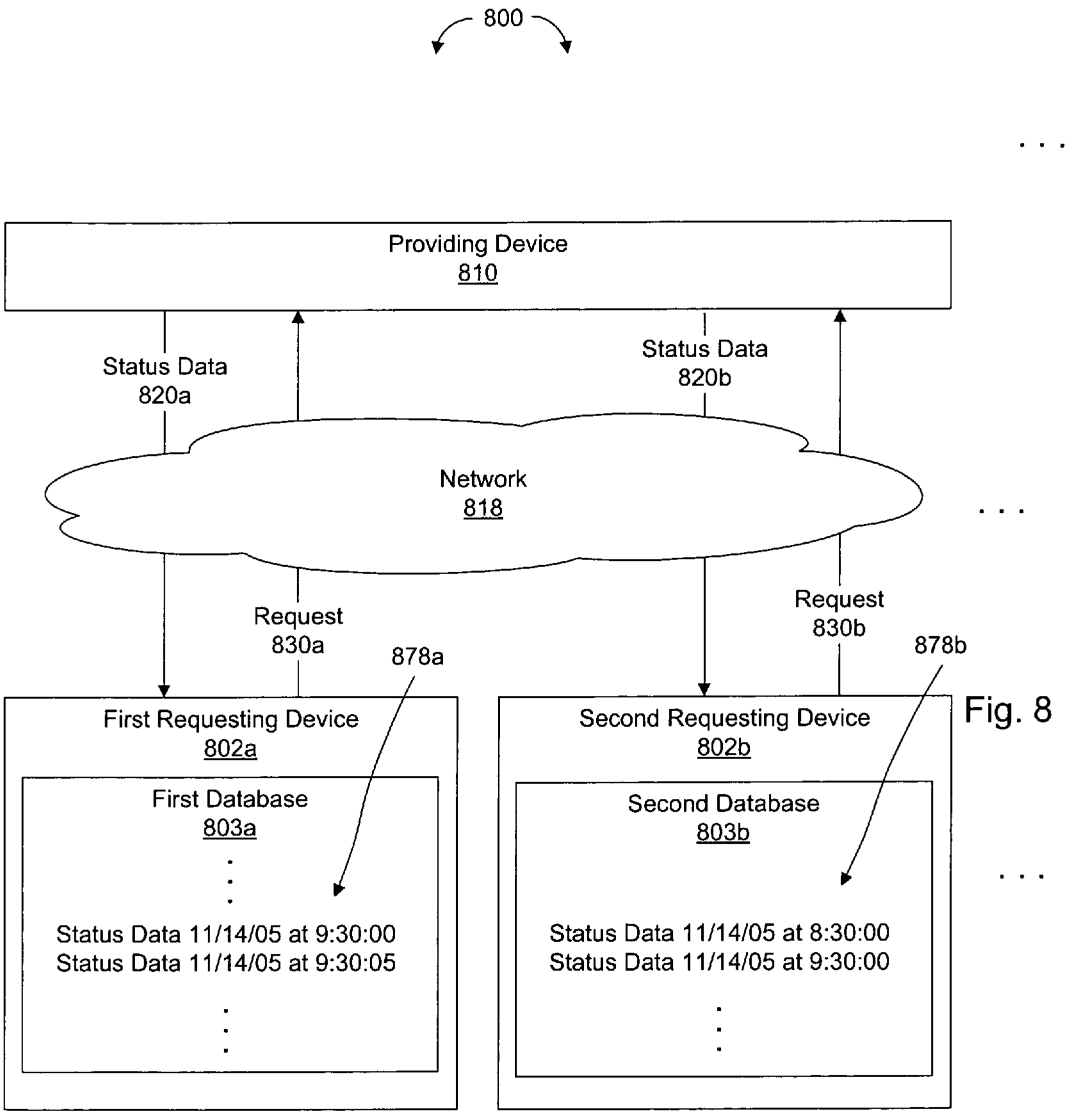
FIG. 8 is a block diagram illustrating a monitoring system including two requesting devices and one providing device.

FIG. 8 illustrates an alternative embodiment of a monitoring system 800. The illustrated system 800 includes a providing device 810 and two requesting devices 802*a-b* in electronic communication via a network 818. For simplicity, the interface definition 311*b*, request processing component 312, and comparison component 313 of the providing device are omitted. Likewise, the status retrieval component 304 and interface definition 311 are not shown in the requesting devices 802*a-b*, again for simplicity. FIG. 8 does, however, depict databases 803*a-b* for each of the requesting devices 802*a-b*. As before, the providing devices 810 provide status data 820*a-b* to the requesting devices 802*a-b* in response to requests 830*a-b* received from the requesting device 802.

The first requesting device 802*a*, as indicated by the time/date values of status data 820 shown in the first database 803*a*, has requested status data 820 every five (5) seconds. In contrast, the second database 803*b*, again as shown by the time/date values of the status data 820 shown in the second database 803*b*, has requested status data 820 only about once an hour.

FIG. 8 illustrates and emphasizes the efficiency of disclosed systems and methods. The system 800 is driven by requests 830 from the requesting device 802, rather than the providing device 810. Accordingly, rather than transmitting data continuously from the providing device 810 (whether or not such information is desired or utilized), transmitting status data 820 only in response to a request minimizes unnecessary network traffic. This can become critical if a significant number of devices (such as a thousand devices) are coupled to the network 818. Broadcasting status data 820 at very small time intervals could also overburden the network 818. Thus, the disclosed system 800 minimizes unnecessary network traffic. Status data 820 typically is smaller (or may be smaller) than a request 830 as fewer current values 770*a* need to be included because they may not have changed.

In addition, the system 800 minimizes the complexity of the providing device 810. The providing device 810 will require only minimal components because it is not required to store status data 820 for a number of different requesting devices 802. Rather, this status data 820 is stored at the requesting device 802. Furthermore, the providing device 810 is not required to determine when status data 820 should be transmitted to requesting devices 802. The first request received is processed and status data 820 is transmitted to the requesting device 802. The providing device 810 does not need complex algorithms or processing power to handle the timing of multiple requests 830 for status data 820.

Of course, the disclosed system 800 may be configured in a number of different ways. For example, many different requesting devices 802 (more than the illustrated two 802*a-b*) may request status data 820 from a particular providing device 810. Moreover, a requesting device 802 may request status data from more than one providing device 810, as will be explained in connection with FIG. 9.

Figure 9:
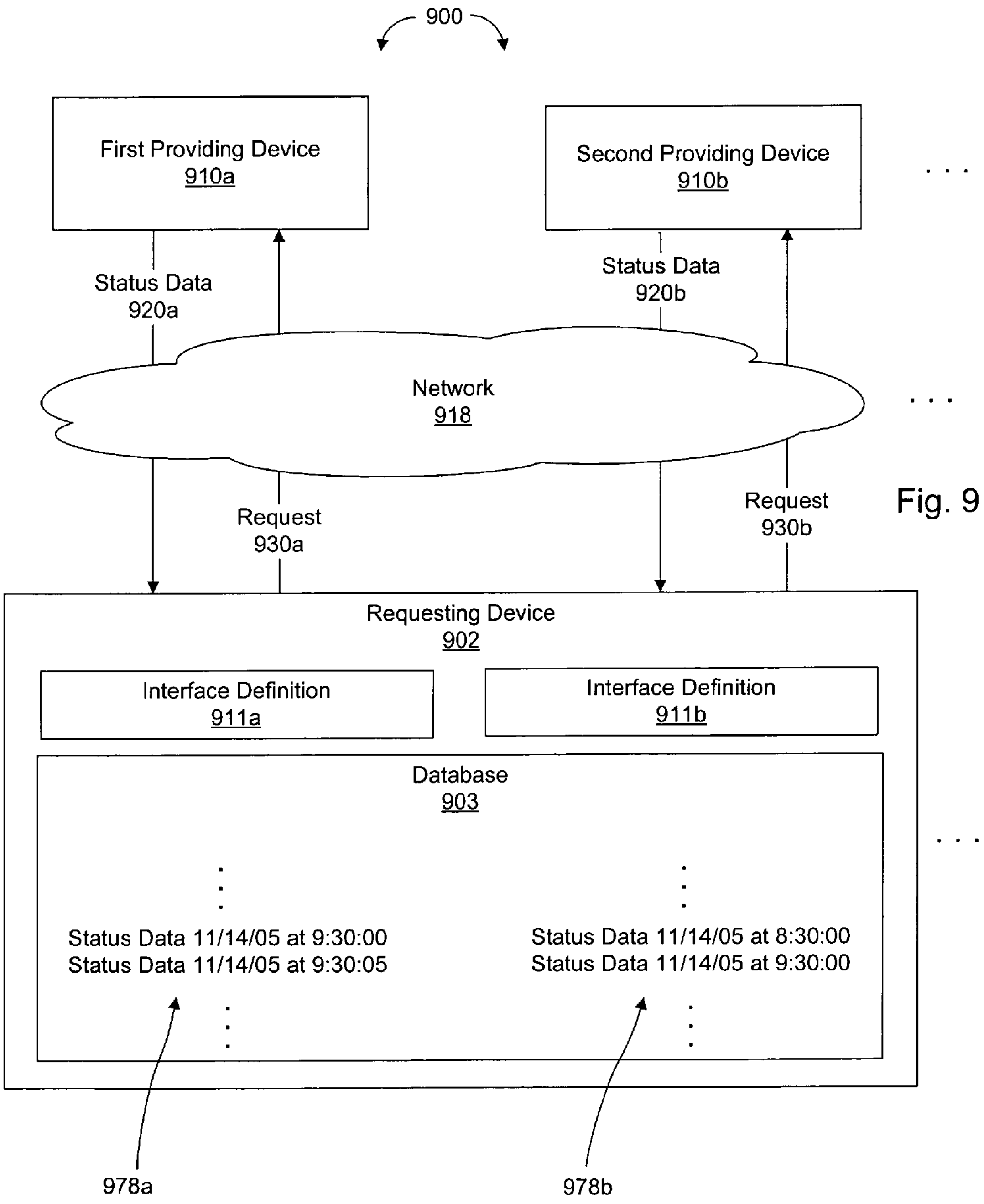
FIG. 9 is a block diagram illustrating a monitoring system including a single requesting device and two providing devices.

FIG. 9 illustrates an alternative embodiment of a monitoring system 900. The monitoring system 900 of FIG. 9 includes two providing devices 910*a-b* and a single requesting device 902. For simplicity, the interface definition 311, request processing component 312, and comparison component 313 of the providing devices 910 are omitted. Likewise, the status retrieval component 304 is not shown in the requesting device 902, again for simplicity. A database 903 for the requesting device 902 and interface definitions 911*a-b* for each of the providing devices 910*a-b*, however, are illustrated.

In the illustrated embodiment, separate requests 930*a-b* are transmitted to each of the providing devices 910*a-b*. In response, status data 920*a-b* is provided to the requesting device 902 via the network 918.

The depicted database includes two status histories 978*a-b*. The first status history 978*a* corresponds to the first providing device 910*a*, and a second status history 978*b* corresponds to the second providing device 910*b*. As explained above, utilizing the requesting device 902 to track status histories 978 provides significant advantages in that the providing devices can be simplified. The disclosed providing devices 910*a-b* do not need to store the status histories 978 but only need to process individual requests 930. This simplified configuration could significantly decrease not only the complexity of a providing device 910 but also its cost to consumers.

As indicated above, the disclosed system 900 could be embodied in a number of different ways. For example, a requesting device 902 may request data from many different providing devices 910, not merely two providing devices 910*a-b*. Further, as is suggested by the combination of FIGS. 8 and 9, a monitoring system 900 could include a requesting device 902 that requests status data 920 from multiple providing devices 910 and a providing device could provide data to multiple requesting devices 902. Furthermore, separate databases 903 may be utilized to store the status data 920 from each providing device 910.

Figure 10:
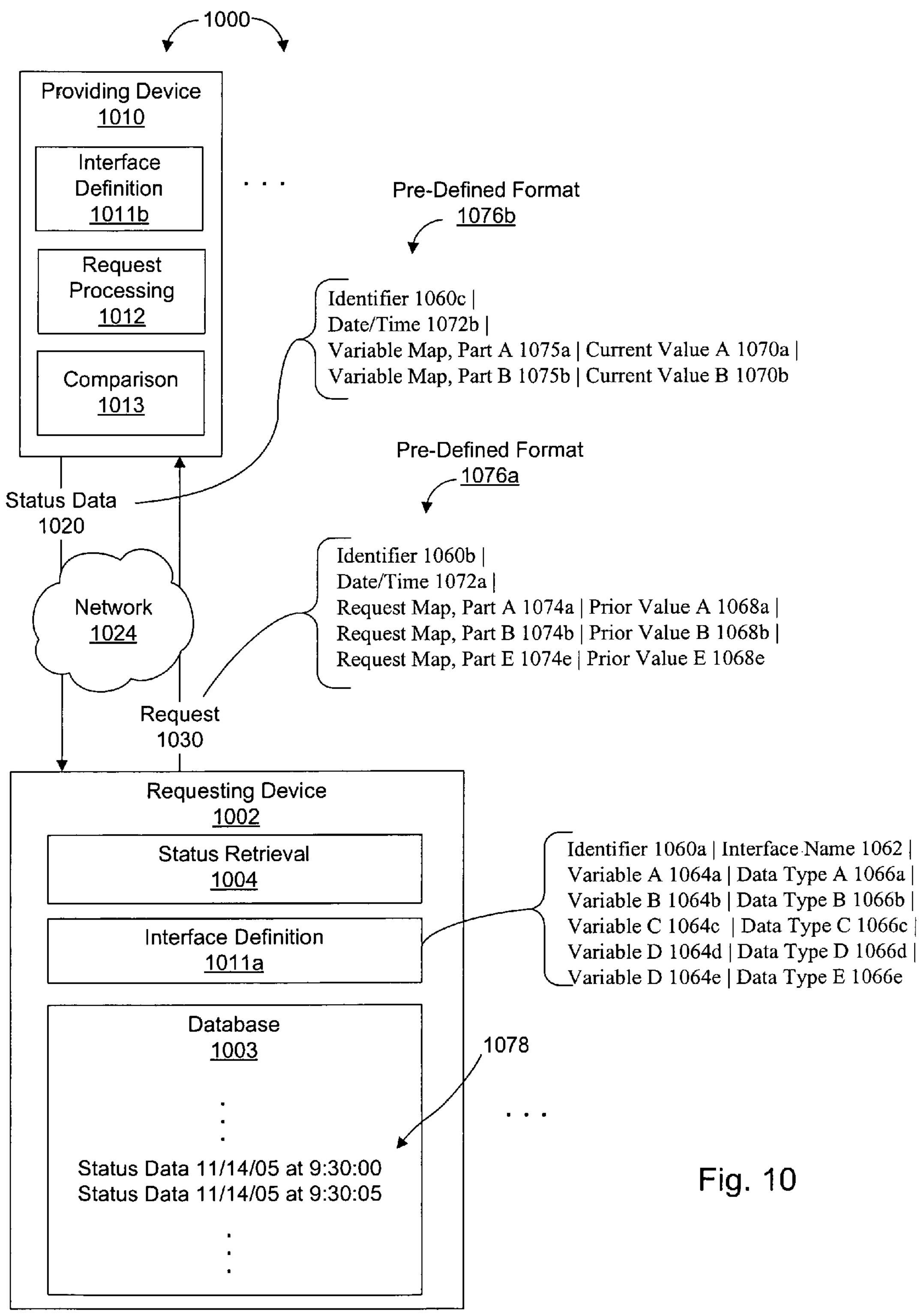
FIG. 10 is a block diagram illustrating one potential alternative embodiment of pre-defined formats for requests and for status data that may be utilized within a monitoring system.

FIG. 10 illustrates an alternate embodiment of a monitoring system 1000. In particular, the system 1000 of FIG. 10 utilizes one embodiment of an alternative format for the request 1030 and status data 1020. As before, the requesting device 1002 may include a status retrieval component 1004, an interface definition 1011*a*, and a database 1003. The interface definition 1011*a* shown in FIG. 10 may be the same interface definition 311*a* shown in FIG. 3. The providing device 1010 may similarly include an interface definition 1011*b*, a request processing component 1012, and a comparison component 1013. These components 1011*b*, 1012, 1013 function in a manner similar to related components 311*b*, 312, 313 disclosed in connection with FIG. 3, except that a different pre-defined format 1076*a-b* for the request 1030 and status data 1020 are utilized. As before, status data 1020 is transmitted to the requesting device 1002 in response to receipt of a request 1030 from the requesting device 1002.

In the illustrated embodiment, the request 1030 includes an identifier 1060*b* and a date/time field 1072*a*, as the request 330 shown in FIG. 3. However, the request map 1074 is different. In particular, the request map 1074 is a noncontiguous set of data. The map 1074, instead, includes distributed segments of data, a field, immediately before the pertinent prior value 1068. For example, part A of the request map 1074*a* (which corresponds to the variable A 1064*a* of the interface definition 1011*a*), could be an integer (for example, the integer "1") to indicate that the variable to follow is prior value A 1068*a*. Accordingly, each part of the request map 1074 comprises a value identifier (designated as a "part" of the request map 1074) that identifies the prior value 1068 that follows it. As illustrated in FIG. 10, current values 1070 for variables A, B, and E 1064*a*, 1064*b*, 1064*e* are requested in the illustrated request 1030. Prior values for each of these variables 1064 are also included within the request 1030. The illustrated request is formatted according to a pre-defined format 1076*a*, as explained above.

The status data 1020 is similarly formatted and includes an identifier 1060*c* and a date/time field 1072*b* associated with the current values 1070. The variable map 1075, like the request map 1074 of FIG. 10, involves noncontiguous data. Part A 1075*a* of the variable map 1075 identifies the current value to follow, i.e., the current value A 1070*a* corresponding to variable A 1064*a*. Part B 1075*b* of the variable map 1075 identifies the current value to follow as a current value B 1070*b* for variable B 1064*b*. In the illustrated embodiment, current values 1070*a-b* for only variables A and B 1064*a-b* are returned because the current value 1070*e* and prior value 1068*e* of variable E 1064*e* were the same. Accordingly, variables A and B 1064*a-b* were changed variables. The status data 1020 shown in FIG. 10 is formatted according to the pre-defined format 1076*b* explained above.

FIGS. 11 and 12 comprise tables illustrating embodiments of requests 1130, 1230 utilizing the pre-defined format 1076*a* of FIG. 10. In contrast, FIG. 13 comprises a table that illustrates an embodiment of status data 1320 using the pre-defined format 1076*b* of FIG. 10. With reference to FIG. 11, the illustrated request 1130 includes a unique identifier 1160*b* and a date/time field 1172*a*. FIG. 11 further illustrates the noncontiguous request map 1174*b*, 1174*c*, 1174*e*. The "2" associated with part B 1174*b* of the request map 1174 indicates that the subsequent data will be the prior value 1168*b* for the variable B 1064*b*, which is the second variable in the interface definition 1011. The "3" associated with part C 1174*c* of the request map 1174 indicates that the subsequent value will be the prior value 1168*c* for variable C 1064*c* and so on. Accordingly, in the embodiment shown in FIG. 11, current values 1070 are requested for variables B, C, and E 1064*b*, 1064*c*, 1064*e*. In addition, prior values 1168*b*, 1168*c*, 1168*e* for each of these variables 1064*b*, 1064*c*, 1064*e* are provided Of course, the disclosed request map 1174 may be embodied in other ways. For example, other techniques may be utilized to identify the value to follow, such as an ASCII code for the letter (e.g., A, B, C) of the corresponding variable 1064 for the pertinent interface definition 1011 may be utilized.

With reference to FIG. 12, another embodiment of a request 1230 is illustrated. In this embodiment, only an identifier 1260*b* is included. The date/time value 1272*a* includes a null value. The remainder of the fields for this request are null (as a result, for example, of a request termination code or null values in those fields), but are not illustrated in FIG. 12. In one embodiment, such request 1230 could be construed as a request to provide current values 1070 for all variables 1064 stored by the providing device 1010.

With reference to FIG. 13, an embodiment of status data 1320 in the pre-defined format 1076*b* shown in FIG. 10 is illustrated. Again, an identifier 1360*c* (which may be omitted) and a date/time value 1372*b* are included. In the illustrated embodiment, current values 1370*a*, 1370*c* for variables A and C 1064*a*, 1064*c* are provided. Current values 1370 for all variables 1064 stored by the providing device 1010 have not been transmitted to the requesting device 1002 (e.g., at least the current value for variable B has not been transmitted). This could be a result of a request 1230 for current values 1370*a*, 1370*c* only for variables A and C 1064*a*, 1064*c*. Alternatively, in one embodiment, this could be the result of a request 1230 for a greater number of variables 1064, but only variables A and C 1064*a*, 1064*c* were different than prior values 1168 provided by the request 1230.

It should be understood that the status data 1320 shown in FIG. 13 is only illustrative. Any number of variables 1064 may be stored by the providing device 1010. All variables 1064 stored by the providing device 1010 may be transmitted to the requesting device 1002. As indicated above, various systems or schemes of numbering or lettering may be utilized within the scope the disclosed variable map 1075 to indicate the current value 1070 to follow.

Figure 14:
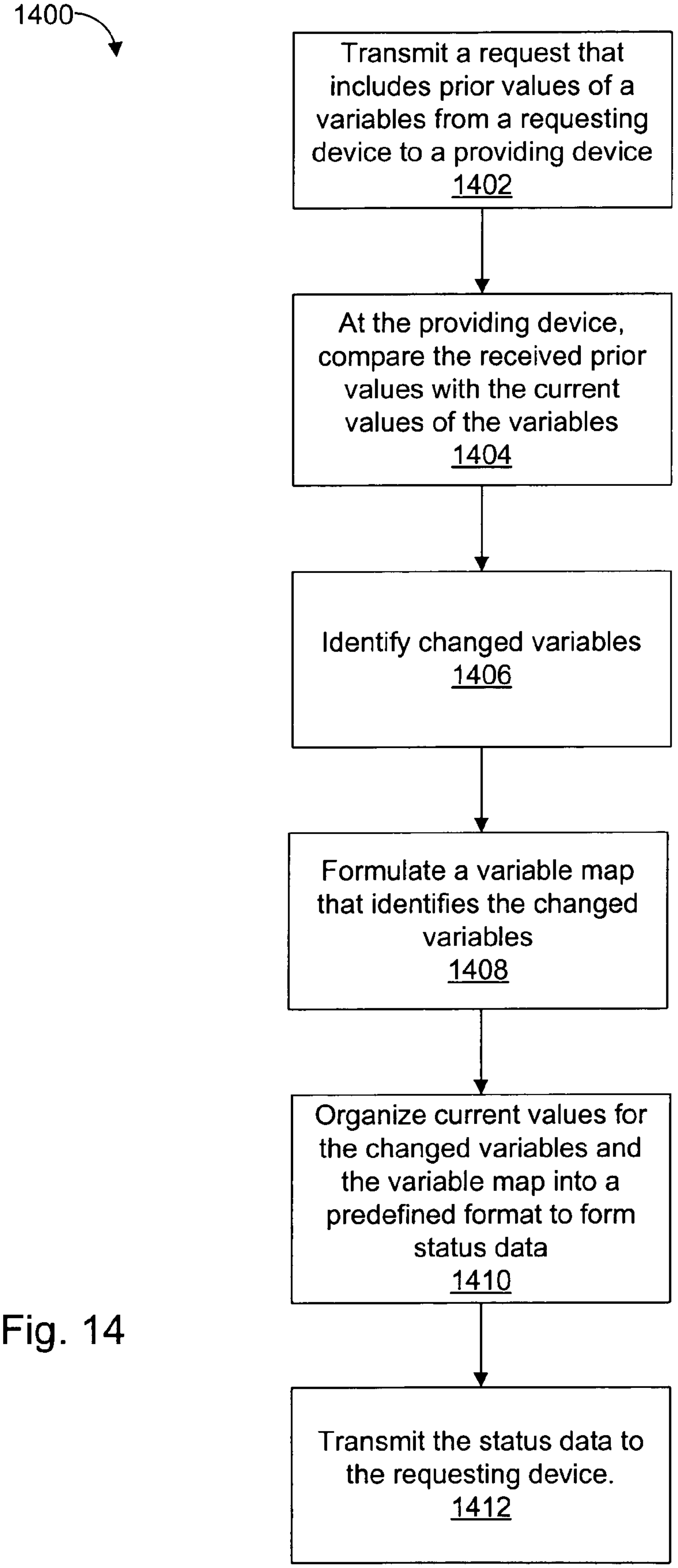
FIG. 14 is a flow diagram illustrating one embodiment of a method for providing status data to a requesting device.

FIG. 14 is a flow diagram of one embodiment of a method 1400 for providing current status data 1320 to a requesting device 1002. A request 1230 is transmitted 1402 from a requesting device 1002 to a providing device 1010. The request may be formatted, for example, as explained in connection with FIGS. 3-6 and 10-12.

The request includes prior values 1168 of variables 1064 stored at the requesting device 1002. The prior values, in one embodiment, may be a null value, as could be the case when the requesting device does not have any status data previously received from the providing device. Alternatively, the prior value could be, for example, a number, a date, a temperature, an amount, a heart rate, a respiration rate, or any other type of measurable value.

In response to receipt of the request at the providing device, the received prior values are compared 1404 to the current values 1370 of variables stored at the providing device. Thereafter, changed variables are identified 1406. The changed variables comprise variables for which the prior value is different from the current value.

Thereafter a variable map is formulated 1408 that identifies the changed variables. The variable map may be embodied in various ways such as a series of bits, as explained in connection with FIGS. 3 and 7. In such an embodiment, each bit corresponds to a variable stored by the providing device. One bit value (e.g., "1") indicates that the corresponding value has changed and the other bit value (e.g., "0") indicates that the value has not changed. Of course, alternative configurations of the variable map 1375 are possible such as those illustrated and explained in connection with FIGS. 10 and 13.

Thereafter, the current values for the changed variables and the variable map are organized 1410 into a pre-defined format 376*b*, 1076*b* to form status data 1320. The pre-defined format 1076 may be embodied in various ways, such as the pre-defined format 376*b*, 1076*b* shown in FIGS. 3 and 10.

Thereafter, the status data is transmitted 1412 to the requesting device 1002. The status data may then be stored in a database 1003 to form a status history 1078.

Status data may be requested at regular intervals by the requesting device. Multiple requesting devices may request data from a single providing device, and a single requesting device may receive status data from multiple providing devices. Accordingly, much of the storage and processing power resides in the requesting device such that the providing device will not require significant processing power and memory to provide the status data to the requesting device. Accordingly, aspects of the providing device related to providing status data may be simple and of minimal cost.

Figure 15:
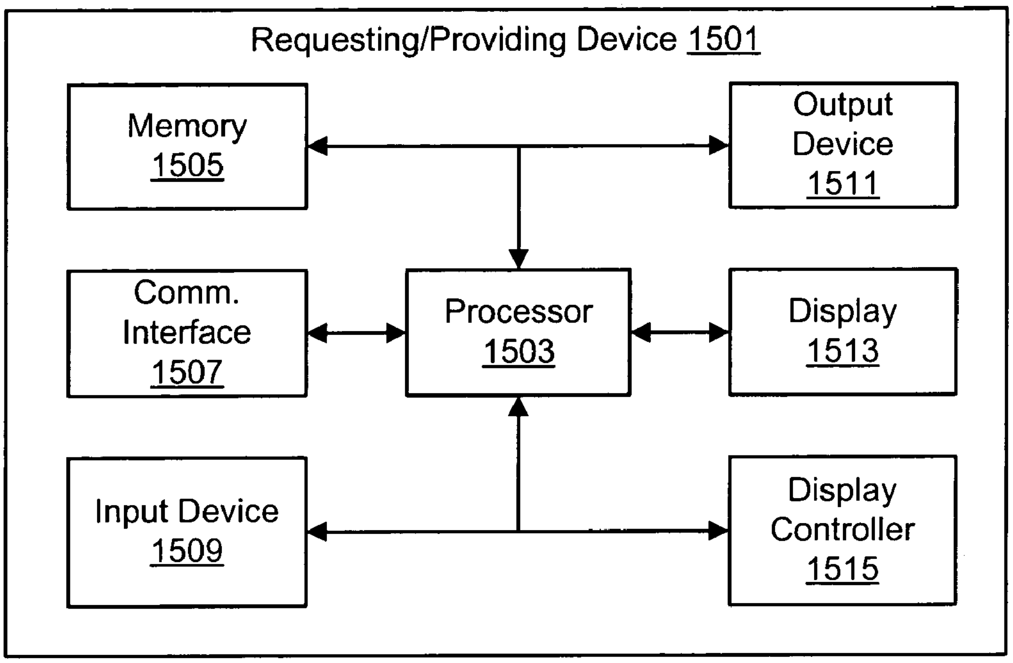
FIG. 15 is a block diagram illustrating the major hardware components typically utilized in requesting and/or providing devices.

FIG. 15 is a block diagram illustrating the major hardware components typically utilized in a requesting or a providing device 1501. The illustrated components may be located within the same physical structure or in separate housings or structures.

The device 1501 includes a processor 1503 and memory 1505. The processor 1503 controls the operation of the device 1501 and may be embodied as a microprocessor, a microcontroller, a digital signal processor (DSP) or other device known in the art. The processor 1503 typically performs logical and arithmetic operations based on program instructions stored within the memory 1505.

As used herein, the term memory 1505 is broadly defined as any electronic component capable of storing electronic information, and may be embodied as read only memory (ROM), random access memory (RAM), magnetic disk storage media, optical storage media, flash memory devices in RAM, on-board memory included with the processor 1503, EPROM memory, EEPROM memory, registers, etc. The memory 1505 typically stores program instructions and other types of data. The program instructions may be executed by the processor 1503 to implement some or all of the methods disclosed herein.

The device 1501 typically also includes one or more communication interfaces 1507 for communicating with other electronic devices. The communication interfaces 1507 may be based on wired communication technology, wireless communication technology, or both. Examples of different types of communication interfaces 1507 include a serial port, a parallel port, a Universal Serial Bus (USB), an Ethernet adapter, an IEEE 1394 bus interface, a small computer system interface (SCSI) bus interface, an infrared (IR) communication port, a BLUETOOTH wireless communication adapter, and so forth.

The device 1501 typically also includes one or more input devices 1509 and one or more output devices 1511. Examples of different kinds of input devices 1509 include a keyboard, mouse, microphone, remote control device, button, joystick, trackball, touchpad, lightpen, etc. Examples of different kinds of output devices 1511 include a speaker, printer, etc. One specific type of output device which is typically included in a computer system is a display device 1513. Display devices 1513 used with embodiments disclosed herein may utilize any suitable image projection technology, such as a cathode ray tube (CRT), liquid crystal display (LCD), light-emitting diode (LED), gas plasma, electroluminescence, or the like. A display controller 1515 may also be provided, for converting data stored in the memory 1505 into text, graphics, and/or moving images (as appropriate) shown on the display device 1513.

Of course, FIG. 15 illustrates only one possible configuration of a device 1501. Various other architectures and components may be utilized.

The device 1501 may be embodied in various ways, such as a personal computer, laptop computer, server, tablet PC, or embedded device. The device 1501 working in conjunction with software or embedded programming may be utilized to perform the systems and methods disclosed herein. The foregoing further describes the components, or optional components, of other computing devices disclosed herein, such as the computer systems 140*a-b* show in FIG. 1.

Figure 16:
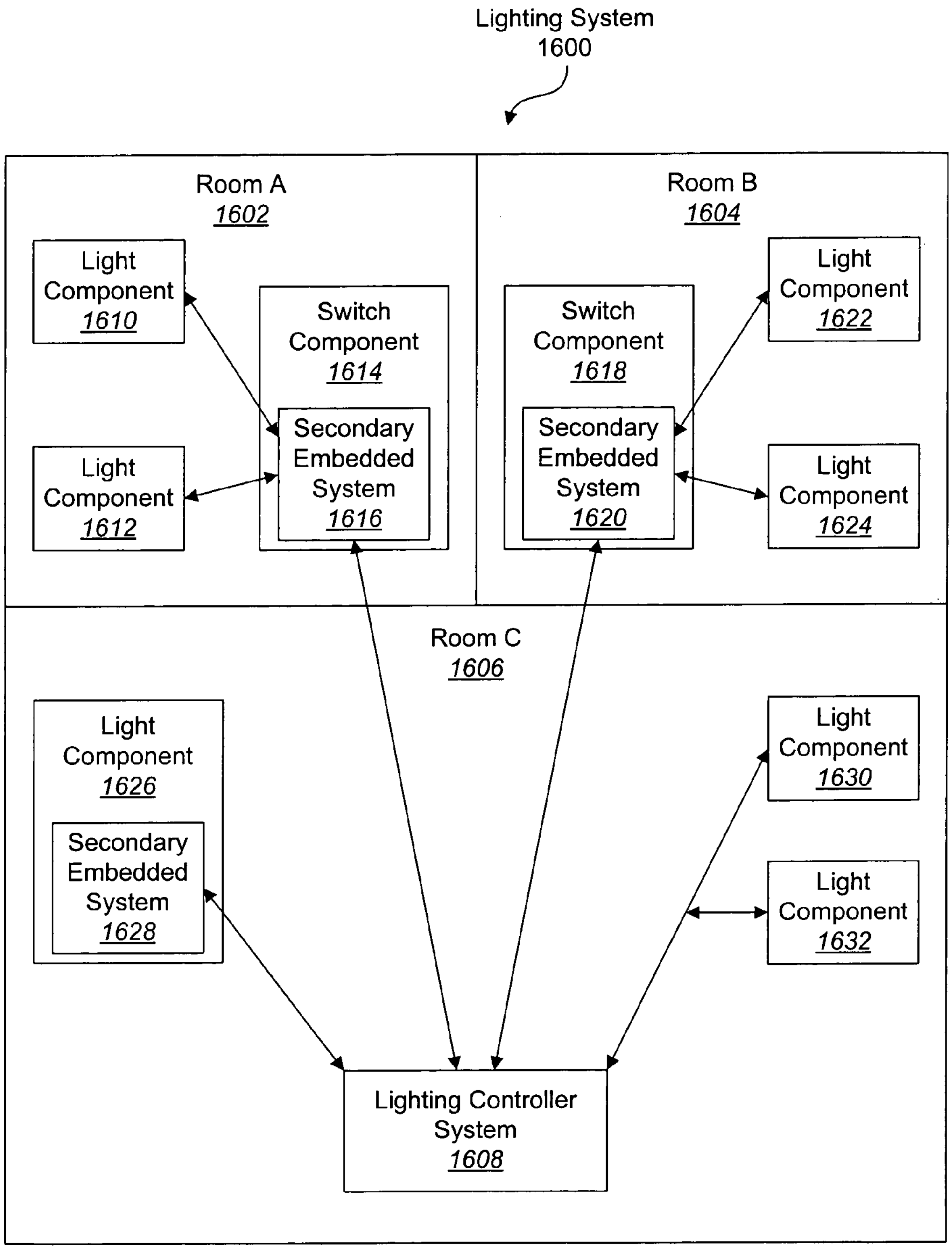
FIG. 16 is a block diagram illustrating a lighting system that may be utilized in connection with the disclosed systems and methods for providing status data to a requesting device.
Figure 17:
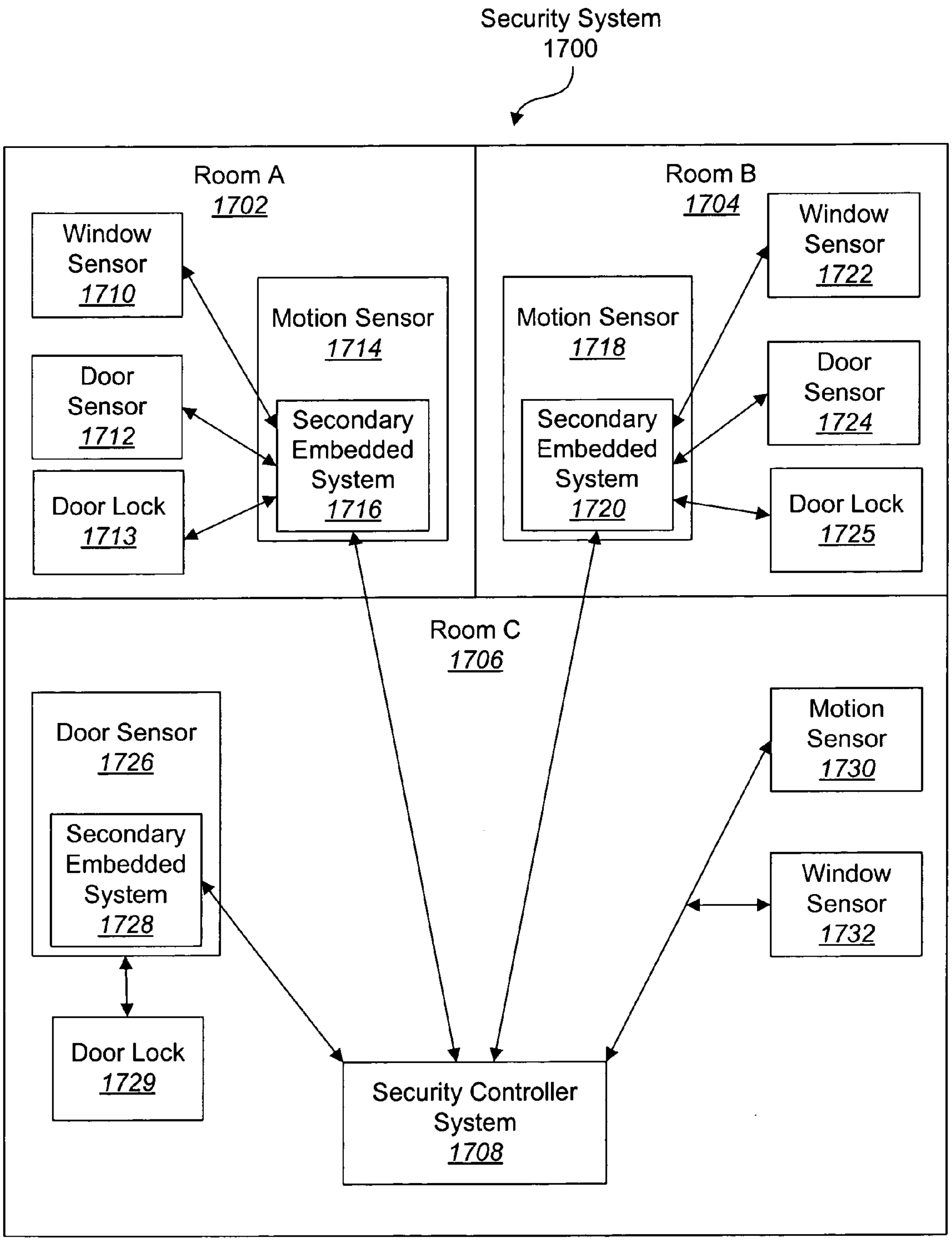
FIG. 17 is a block diagram illustrating a security system that may be utilized in connection with the disclosed systems and methods for providing status data to a requesting device.
Figure 18:
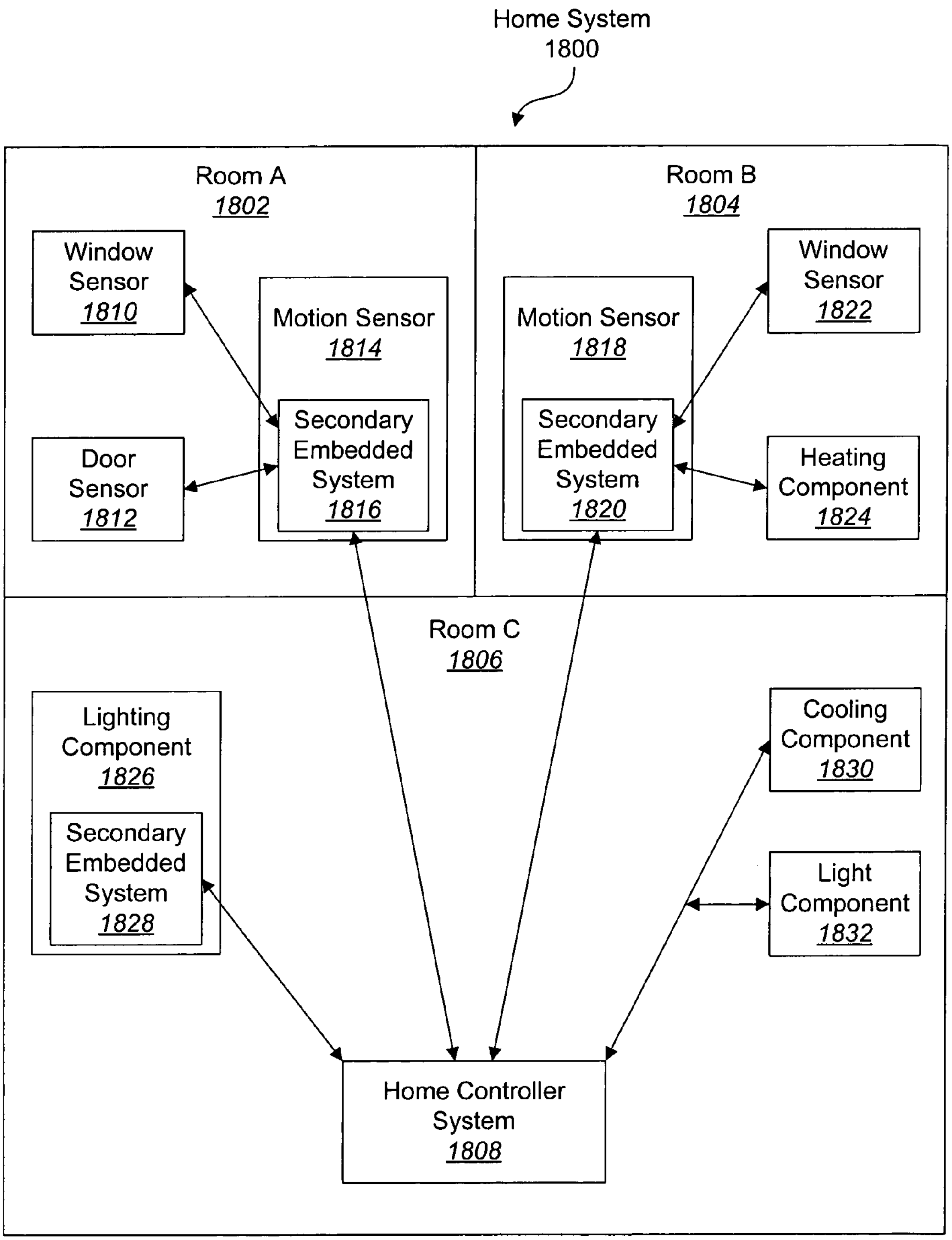
FIG. 18 is a block diagram illustrating a home system that may be utilized in connection with the disclosed systems and methods for providing status data to a requesting device.

The present systems and methods may be used in several contexts. For example, monitoring systems (e.g., as shown in FIGS. 3, and 8-10) may be utilized in connection with various control systems (as explained and illustrated in connection with in FIG. 1). Examples of various control systems are shown in FIGS. 16-18. The monitoring systems and control systems may utilize the same network, requesting devices, and providing devices.

FIG. 16 is a block diagram that illustrates one embodiment of a lighting system 1600 that includes a lighting controller system 1608. The lighting system 1600 of FIG. 16 may be incorporated, for example, into various rooms within a home. As illustrated, the system 1600 includes a room A 1602, a room B 1604, and a room C 1606. This system 1600 may be implemented in any number and variety of rooms within a home, dwelling, building, or other environment.

The lighting controller system 1608 may monitor and control additional embedded systems and components within the system 1600. In one embodiment, room A 1602 and the room B 1604 each include a switch component 1614, 1618. The switch components 1614, 1618 may also include a secondary embedded system 1616, 1620. The secondary embedded systems 1616, 1620 may receive instructions from the central lighting controller system 1608. The secondary embedded systems 1616, 1620 may then execute these instructions. The instructions may include powering up or powering down various light components 1610, 1612, 1622, and 1624. The instructions may also include dimming or increasing the brightness of the various light components 1610, 1612, 1622, and 1624. The instructions may further include arranging the brightness of the light components 1610, 1612, 1622, and 1624 in various patterns. The secondary embedded systems 1616, 1620 may also facilitate monitoring and controlling each light component 1610, 1612, 1622, and 1624 through the central embedded system 1608.

The lighting controller system 1608 might also provide instructions directly to a light component 1626 that includes a secondary embedded system 1628 in room C 1606. The central embedded system 1608 may, for example, instruct the secondary embedded system 1628 to power down or power up the individual light component 1626. Similarly, the instructions received from the central embedded system 1608 may include dimming or increasing the brightness of the individual light component 1626. The lighting controller system 1608 may also monitor and provide instructions directly to individual light components 1630, 1632 within the system 1600.

FIG. 17 is a block diagram illustrating one embodiment of a security system 1700. As with the lighting system, the security system 1700, in the depicted embodiment, is implemented in a room A 1702, a room B 1704, and a room C 1706. These rooms may be in the confines of a home or other enclosed environment. The system 1700 may also be implemented in an unenclosed environment where the rooms A, B and C, 1702, 1704, 1706 represent territories or boundaries.

The system 1700 includes a security controller system 1708. The security controller system 1708 monitors and receives information from the various components within the system 1700. For example, motion sensors 1714, 1718 in rooms A and B 1702, 1704 may each include a secondary embedded system 1716, 1720. The motion sensors 1714, 1718 may monitor an area for motion and alert the security controller system 1708 when motion is detected via the secondary embedded systems 1716, 1720. The security controller system 1708 may also provide instructions to the various components within the system 1700. For example, the security controller system 1708 may provide instructions to the secondary embedded systems 1716, 1720 to power up or power down a window sensor 1710, 1722, a door sensor 1712, 1724, or a door lock 1713, 1725. In one embodiment, the secondary embedded systems 1716, 1720 notify the security controller system 1708 when the window sensors 1710, 1722 detect movement of a window. Similarly, the secondary embedded systems 1716, 1720 notify the security controller system 1708 when the door sensors 1712, 1724 detect movement of a door.

The security controller system 1708 may also monitor and provide instructions directly to individual components within the system 1700. For example, the security controller system 1708 may monitor and provide instructions to power up or power down a motion or window sensor 1730, 1732.

Each individual component comprising the system 1700 may also include a secondary embedded system. For example, FIG. 17 illustrates a door sensor 1726 including a secondary embedded system 1728. An electronic door lock 1729 is also shown. The security controller system 1708 may monitor and provide instructions to the secondary embedded system 1728 as similarly described above.

FIG. 18 is a block diagram illustrating one embodiment of a home system 1800. The home system 1800 includes a home controller system 1808 that facilitates the monitoring of various systems, such as the lighting system 1600, the security system 1700, and the like. The home system 1800 allows a user to control various components and systems through one or more embedded devices. In one embodiment, the home controller system 1808 monitors and provides information in the same manner as previously described in relation to FIGS. 16 and 17. In the depicted embodiment, the home controller system 1808 provides instructions to a heating component 1824 via a secondary embedded system 1820. The heating component 1824 may include a furnace or other heating device typically found in resident locations or offices. The home controller system 1808 may provide instructions to power up or power down the heating component 1824 via the secondary embedded system 1820.

Similarly, the home controller system 1808 may monitor and provide instructions directly to a component within the home system 1800, such as a cooling component 1830. The cooling component 1830 may include an air conditioner or other cooling device typically found in resident locations or offices. The home controller system 1808 may instruct the cooling component 1830 to power up or down depending on the temperature reading collected by the home controller system 1808. The home system 1800 functions in a similar manner as previously described in relation to FIGS. 16 and 17.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing current status data to a requesting device comprising:

transmitting a request for status data from a requesting device to a providing device, wherein the request includes prior values of variables stored at the requesting device;

receiving, at the providing device, the request that includes the prior values of variables stored at the requesting device, wherein the providing device is a device that is different than the requesting device;

at the providing device, comparing the transmitted and received prior values with current values of the variables stored at the providing device;

at the providing device, identifying changed variables that comprise variables for which the current value is different from the transmitted and received prior value;

at the providing device, formulating a variable map that identifies the changed variables, wherein the variable map comprises a series of bits, each bit corresponding to one of the variables stored by the providing device, and wherein one bit value indicates that the corresponding variable is a changed variable and another bit value indicates that the current and prior values of the corresponding variable are equal;

at the providing device, organizing current values for the changed variables and the variable map into a pre-defined format to form status data; and transmitting the status data to the requesting device.

2. The method of claim 1, wherein the variable map further identifies which variables have not changed.

3. The method of claim 1, wherein the request further comprises a request map, the request map identifying variables for which current values are requested.

4. The method of claim 1, wherein an order of variables in the status data is determined by the order of the variables within an interface definition.

5. The method of claim 1, wherein an order of bits within the series of bits corresponds to the order of the variables within the interface definition.

6. The method of claim 1, wherein the request is organized into a pre-defined format.

7. The method of claim 1, wherein the variable map comprises a series of integers, each integer identifying a variable stored by the providing device.

8. The method of claim 1, wherein the providing device is an embedded device.

9. The method of claim 1, wherein the status data further comprises an identifier that uniquely identifies the providing device.

10. The method of claim 1, wherein the prior values of variables stored by the requesting device are null values.

11. A system that is configured to provide current status data to a requesting device, the system comprising:

a providing device having provider memory and a provider processor in electronic communication therewith;

a requesting device having requestor memory and a requestor processor in electronic communication therewith, wherein the providing device and the requesting device are in electronic communication with each other, wherein the providing device is a device that is different than the requesting device;

instructions stored in the provider memory and in the requestor memory, the instructions being executable to:

transmit a request for status data from the requesting device to the providing device, wherein the request includes prior values of variables stored at the requesting device;

receive, at the providing device, the request that includes the prior values of variables stored at the requesting device;

at the providing device, compare the transmitted and received prior values with current values of the variables stored at the providing device;

at the providing device, identify changed variables that comprise variables for which the current value is different from the transmitted and received prior value;

at the providing device, formulate a variable map that identifies the changed variables, wherein the variable map comprises a series of bits, each bit corresponding to one of the variables stored by the providing device, and wherein one bit value indicates that the corresponding variable is a changed variable and another bit value indicates that the current and prior values of the corresponding variable are equal;

at the providing device, organize current values for the changed variables and the variable map into a predefined format to form status data; and transmit the status data to the requesting device.

12. The system of claim 11, wherein the variable map further identifies which variables have not changed.

13. The system of claim 11, wherein the request further comprises a request map, the request map identifying variables for which current values are requested.

14. The system of claim 11, wherein an order of variables in the status data is determined by the order of the variables within an interface definition.

15. A system that is configured to provide current status data to a requesting device, the system comprising:

a providing device having provider memory and a provider processor in electronic communication therewith;

a requesting device having requestor memory and a requestor processor in electronic communication therewith, wherein the providing device and requesting device are in electronic communication with each other, wherein the providing device is a device that is different than the requesting device;

instructions stored in the provider memory and in the requestor memory, the instructions being executable to:

transmit a request for status data from the requesting device to the providing device, wherein the request includes prior values of variables stored at the requesting device and further includes a request map including a series of bits that identify variables for which current values are requested;

receive, at the providing device, the request that includes the prior values of variables stored at the requesting device;

at the providing device, compare the transmitted and received prior values with current values of the variables stored at the providing device;

at the providing device, identify changed variables that comprise variables for which the current value is different from the transmitted and received prior value;

at the providing device, formulate a variable map that identifies the changed variables utilizing a series of bits, wherein the variable map comprises a series of bits, each bit corresponding to one of the variables stored by the providing device, and wherein one bit value indicates that the corresponding variable is a changed variable and another bit value indicates that the current and prior values of the corresponding variable are equal;

at the providing device, organize current values for the changed variables and the variable map into a predefined format to form status data; and transmit the status data to the requesting device.

16. A computer-readable medium comprising executable instructions to provide current status data to a requesting device, the instructions being executable to:

transmit a request for status data from a requesting device to a providing device, wherein the request includes prior values of variables stored at the requesting device;

receive, at the providing device, the request that includes the prior values of variables stored at the requesting device, wherein the providing device is a device that is different than the requesting device;

at the providing device, compare the transmitted and received prior values with current values of the variables stored at the providing device;

at the providing device, identify changed variables that comprise variables for which the current value is different from the transmitted and received prior value;

at the providing device, formulate a variable map that identifies the changed variables, wherein the variable map comprises a series of bits, each bit corresponding to one of the variables stored by the providing device, and wherein one bit value indicates that the corresponding variable is a changed variable and another bit value indicates that the current and prior values of the corresponding variable are equal;

at the providing device, organize current values for the changed variables and the variable map into a pre-defined format to form status data; and transmit the status data to the requesting device.

17. The computer-readable medium of claim 16, wherein the request further comprises a request map, the request map identifying variables for which current values are requested.

* * * * *

UNITED STATES PATENT AND TRADEMARK OFFICE

CERTIFICATE OF CORRECTION

PATENT NO. : 7,693,984 B2
APPLICATION NO. : 11/321713
DATED : April 6, 2010
INVENTOR(S) : David Bashford et al.

It is certified that error appears in the above-identified patent and that said Letters Patent is hereby corrected as shown below:

IN THE SPECIFICATION:

In column 4, line 24 please delete “requester” and replace it with --requestor--.
In column 6, line 25 please delete “though” and replace it with --through--.

Signed and Sealed this

Thirty-first Day of August, 2010

David J. Kappos
*Director of the United States Patent and Trademark Office*